(12) United States Patent
Nishimura

(10) Patent No.: US 6,398,567 B1
(45) Date of Patent: Jun. 4, 2002

(54) LOCK AND LOCK RELEASING MECHANISM IN IC CARD CONNECTING MECHANISM

(75) Inventor: Takeshi Nishimura, Santa Clara, CA (US)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 09/526,729

(22) Filed: Mar. 16, 2000

(30) Foreign Application Priority Data

Mar. 19, 1999 (JP) .......................................... 11-076785

(51) Int. Cl.⁷ .............................................. H01R 13/62
(52) U.S. Cl. ....................... 439/159; 439/328; 439/352; 439/923
(58) Field of Search ................................ 439/159–160, 439/152, 260–267, 630, 352, 328, 923, 155, 140

(56) References Cited

U.S. PATENT DOCUMENTS

| | | | | |
|---|---|---|---|---|
| 3,823,367 A | * | 7/1974 | Kaye et al. .................. | 439/352 |
| 4,780,793 A | * | 10/1988 | Ohtsuki ....................... | 439/140 |
| 4,810,200 A | * | 3/1989 | Sakamoto .................... | 439/155 |
| 4,810,203 A | * | 3/1989 | Komatsu ..................... | 439/260 |
| 4,961,710 A | * | 10/1990 | Komatsu ..................... | 439/260 |
| 5,026,296 A | * | 6/1991 | Hashiguchi .................. | 439/159 |
| 5,036,430 A | * | 7/1991 | Hills ............................ | 439/140 |
| 5,051,101 A | * | 9/1991 | Komatsu ..................... | 439/159 |
| 5,470,241 A | * | 11/1995 | Kaufman et al. ........... | 439/159 |
| 5,674,080 A | * | 10/1997 | Takemura .................... | 439/260 |
| 6,203,378 B1 | * | 3/2001 | Shobara et al. ............. | 439/155 |

FOREIGN PATENT DOCUMENTS

| | | |
|---|---|---|
| JP | 10-21350 | 1/1998 |
| JP | 11-66245 | 3/1999 |

* cited by examiner

*Primary Examiner*—Hien Vu
(74) *Attorney, Agent, or Firm*—Wenderoth, Lind & Ponack, L.L.P.

(57) ABSTRACT

A lock and lock releasing mechanism for an IC card connecting mechanism comprising a resilient lock arm for accumulating a preliminary resilient force by being resiliently contacted with one side edge of an IC card to be received in a card receiving space through a card inlet port of the card connecting mechanism. The resilient lock arm is arranged to engage in a recess formed on the side edge of the IC card in order to establish the locked state of the IC card. The lock and lock releasing mechanism also comprises a control member that is arranged to selectively engage the resilient lock arm so that the resilient lock arm moves against its resiliency to disengage from the recess formed on the side edge of the IC card, thereby establishing a lock released state of the IC card.

12 Claims, 13 Drawing Sheets

LOCK AND LOCK RELEASING MECHANISM IN IC CARD CONNECTING MECHANISM

BACKGROUND OF THE INVENTION

1. Field of the Invention

This invention relates to a lock and lock releasing mechanism in an IC card connecting mechanism in which an IC card is inserted into a card receiving space through a card inlet port so that external contacts of the IC card are electrically connected to contacts arranged within the card receiving space, and more particularly to a lock and lock releasing mechanism in which a locked state for retaining an IC card in an inserting position and a lock released state for permitting the IC card to be ejected are established.

2. Related Art

There is known a mechanism which is disclosed, for example, in Japanese Patent Unexamined Publication (Kokai) No. Hei 10-21350 in which when an IC card is inserted into a card receiving space through an IC card inlet port, a card ejecting member is pressed by a front end face of the IC card to thereby establish an ejection standby state, an engagement portion of a resilient lock member is resiliently contacted with one side surface of the IC card to be received in the card receiving space to thereby accumulate preliminary resilient force, and the engagement portion is resiliently engaged in a recess formed in one side surface of the IC card by the preliminary resilient force when the IC card is inserted to a predetermined location, thereby establishing a locked state of the IC card.

In this conventional art, when the lock member is in resilient engagement in the recess of the IC card, the card ejecting member is actuated to eject the IC card. Accordingly, the lock member is forcibly disengaged from the recess by the pressing force of the card ejecting member.

Because of the arrangement mentioned above, the pressing force of the card ejecting member tends to be overly large. As a result, an overly large load is applied to the IC card due to the structure in which the lock member is pushed out of the recess by the IC card. Those inconveniences are even increased when it is attempted to enlarge the card retaining force by increasing the resilient force of the lock member.

Japanese Patent Unexamined Publication (Kokai) No. Hei 11-66245 discloses a comparable mechanism of the type including a card ejecting member which is pressed by an IC card when inserted, to thereby accumulate ejecting resilient force. This conventional related art employs a heart cam as a lock and lock releasing mechanism. In this mechanism, a locked state is established such that the ejecting member accumulates an ejecting resilient force and the locked state is released to allow the ejecting operation.

However, this heart cam mechanism inherently involves such problems that the structure is complicated and machining of high degree of accuracy is required. In addition, it has such problems that since the cam is slidingly moved through a complicated locus, the cam is susceptible to wear and in some instances, the heart cam fails to guide properly which often results in malfunction.

The present invention has been accomplished in view of the above situation.

SUMMARY OF THE INVENTION

It is, therefore, an object of the present invention to provide a lock and lock releasing mechanism in an IC card connecting mechanism which is capable of reliably establishing a locked state and a lock released state of an IC card.

In order to achieve the above object, according to one aspect of the present invention, there is essentially provided a lock and lock releasing mechanism in an IC card connecting mechanism comprising a resilient lock arm for accumulating preliminary resilient force by being resiliently contacted with one side edge of an IC card to be received in a card receiving space through a card inlet port, and a control member in which the resilient lock arm is engaged, by the preliminary resilient force, in a recess formed in the one side edge portion of the IC card while being relatively slidably moved on the one side edge of the IC card when the IC card is inserted to a predetermined location, thereby establishing a locked state of the IC card. On the other hand, the lock arm is resiliently displaced against the resilient force of the lock arm so that the lock arm is disengaged from the recess, thereby establishing a lock released state of the IC card.

In one preferred embodiment, the above mechanism further comprises a card ejecting member which is caused to move by being pressed by a front surface of the IC card thereby accumulating ejecting resilient force. The lock arm engaged in the recess is engaged with an inner surface of the recess against the ejecting resilient force.

Preferably, the resilient lock arm is formed of a cantilever arm extending from a basal end, which is fixed, towards the card inlet port. The other end of the resilient lock arm, this other end being the opposite end to the fixed basal end of the cantilever arm, includes a pressure receiving portion which is acted on by the control member so that the cantilever arm is resiliently displaced at the fixed basal end as a supporting point and disengaged from the recess.

From another aspect of the present invention, there is also provided a lock and lock releasing mechanism in an IC card connecting mechanism comprising an eject member which is moved when an IC card is received in a card receiving space through a card inlet port so as to accumulate card ejecting resilient force, a resilient lock arm which resiliently contacts with one side edge of the card ejecting member so as to accumulate preliminary resilient force, and a control member in which the resilient lock arm is engaged, by the preliminary resilient force, with a recess or protrusion formed in the one side edge portion of the IC card while being relatively slidably moved on the one side edge of the IC card when the IC card is inserted to a predetermined location, thereby establishing a locked state of the IC card. On the other hand, the lock arm is resiliently displaced against the resilient force of the lock arm so that the lock arm is disengaged from the recess or protrusion, thereby establishing a lock released state of the IC card.

In one embodiment, the resilient lock arm is formed of a cantilever arm extending from a basal end, which is fixed, towards the card inlet port. The other end of the resilient lock arm, this other end being the opposite end to the fixed basal end of the cantilever arm, includes a pressure receiving portion which is acted on by the control member so that the cantilever arm is resiliently displaced at the fixed basal end as a supporting point and disengaged from the recess or protrusion.

Preferably, an inner end face of the control member for the lock releasing operation is defined as a slant surface for pressing the pressure receiving portion of the lock arm, and the pressure receiving portion is disposed in abutment or proximately opposing relation to the slant surface thereby establishing a standby state of the control member.

A more complete application of the invention and many of the attendant advantages thereof will be readily obtained as the same becomes better understood by reference to the following detailed description when considered in connection with the accompanying drawings.

BRIEF DESCRIPTION OF THE DRAWINGS

FIGS. 1 to 9 exemplify a lock and lock releasing mechanism according to one embodiment of the present invention, in which a lock arm is brought into engagement with and disengagement from a card ejecting member; wherein FIG. 1 is a plan view of one example in which a lock arm is brought into engagement with and disengagement from a protrusion formed on a card ejecting member and which shows a state before insertion of an IC card;

FIG. 2 is a plan view of the lock and lock releasing mechanism of FIG. 1, but shows a state immediately before the complete insertion of an IC card;

FIG. 3 is a plan view of the lock and lock releasing mechanism of FIG. 1, but shows a state of complete insertion (locked state) of an IC card;

FIG. 4 is a plan view of the lock and lock releasing mechanism of FIG. 1, but shows a lock released state of the IC card with respect to the card releasing mechanism;

FIG. 6 is a plan view of one example in which a lock arm is brought into engagement with and disengagement from a recess formed in the card ejecting member and which shows a state before insertion of an IC card;

FIG. 7 is a plan view of the lock and lock releasing mechanism of FIG. 6, but shows a locked state after insertion of an IC card;

FIG. 8 is a plan view of another example in which a lock arm is brought into engagement with and disengagement from a protrusion formed on a card ejecting member and which shows a state before insertion of an IC card;

FIG. 9 is a plan view of the lock and lock releasing mechanism of FIG. 8, but shows a state of complete insertion (locked state) of an IC card;

FIGS. 10 to 13 exemplify a lock and lock releasing mechanism according to another embodiment of the present convention, in which a lock arm is brought into engagement with and disengagement from an IC card; wherein FIG. 10 is a plan view of one example in which a lock arm is brought into engagement with and disengagement from a recess formed in an IC card and which shows a state before insertion of an IC card;

FIG. 11 is a plan view of the lock and lock releasing mechanism of FIG. 10 but shows a state immediately before complete insertion of an IC card;

FIG. 12 is a plan view of the lock and lock releasing mechanism of FIG. 10 but shows a state of complete insertion (locked state) of an IC card;

FIG. 13 is a plan view of the lock and lock releasing mechanism of FIG. 10 but shows a lock released state of an IC card with respect to a card ejecting member;

DETAILED DESCRIPTION OF THE EMBODIMENTS

Figure 1:
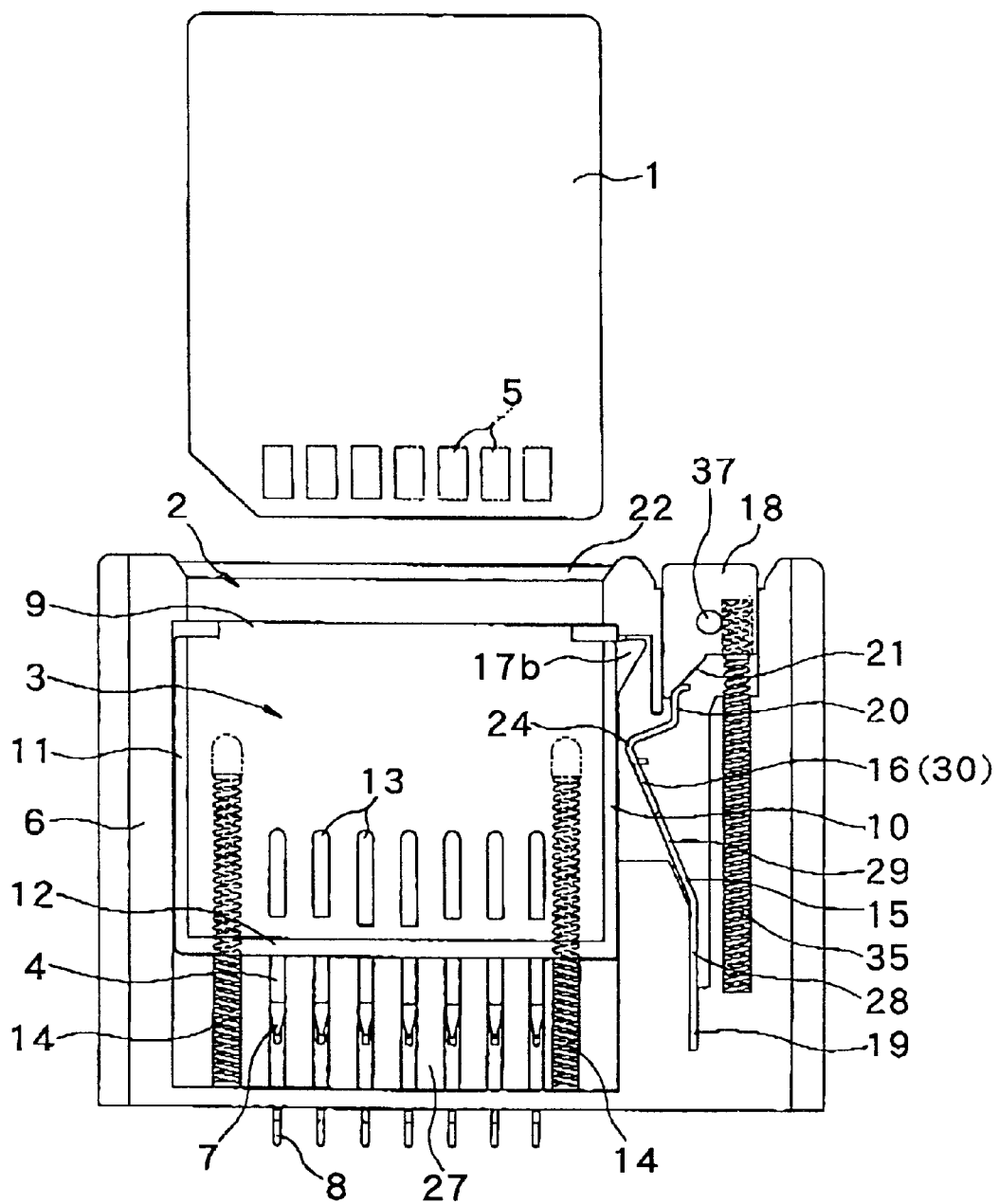

FIGS. 1 to 9 exemplify a lock and lock releasing mechanism according to one embodiment of the present invention, in which a lock arm 15 is brought into engagement with and disengagement from a card ejecting member, while FIGS. 10 to 16 exemplify another type of a lock and lock releasing mechanism, in which a lock arm 15 is brought into engagement with and disengagement from an IC card 1.

The IC card 1 is of the type having an IC chip, which is inserted into a given electronic device such as, for example, a personal computer, in order to record thereon information from the electronic device or to input information, which the IC card 1 possesses, on the electronic device. The IC card 1 includes one which contains therein a CPU.

The IC card 1 is provided with external contacts 5 which, when the IC card 1 is inserted into a card receiving space 3 through a card inlet port 2, are pressure contacted with contacts 4 arranged within the card receiving space 3.

The contacts 4 are implanted in a bottom plate 27 of a card case 6 which defines the card receiving space 3. Each contact 4 is provided on one end thereof with a pressure contact portion 7 which is subjected to pressure contact with the corresponding external contact 5 of the IC card 1 and on the other end with a terminal portion 8 which is subjected to connection with a wiring circuit board.

Disposed within the card receiving space 3 is a contact opening- and closing slide plate 9 opposing a lower surface of the IC card 1 which is inserted through the card inlet port 2.

The contact opening- and closing-slide plate 9 of FIGS. 1 to 9 includes a first and a second side guide 10,11 for regulating the left and right side surfaces of the IC card 1, and a front abutment 12 with which a front surface of the IC card 1 is abutted. When the IC card 1 is inserted into the card receiving space 3 by way of the first and second side guides 10,11, a front end face of the IC card 1 presses the front abutment 12 to cause the slide plate 9 to move following the inserting motion of the IC card 1.

On the other hand, the contact opening- and closing slide plate 9 of FIGS. 10 to 16 does not include the first and second side guides 10,11. It includes only the front abutment 12 extending along the front end face. When the IC card 1 is inserted into the card receiving space 3 by way of the guide of inner side walls of the card receiving space 3, the front end face of the IC card 1 presses the front abutment 12 to cause the slide plate 9 to move following the inserting motion of the IC card 1.

The contact opening- and closing-slide plate 9 is provided with control holes 13 formed therethrough and adapted to control the opening and closing operation of the contacts 4.

Figure 5A:
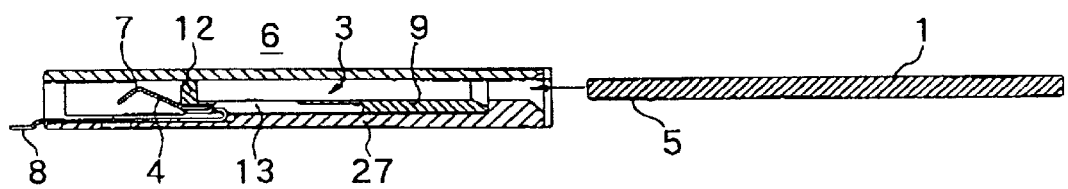
FIG. 5A is a sectional view showing a contact released state of the contacts in the lock and lock releasing mechanism with respect to external contacts of an IC card.
Figure 5B:
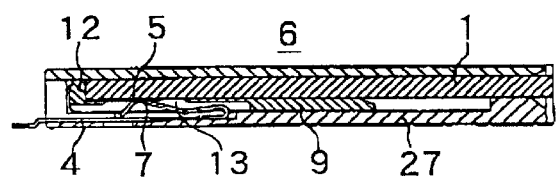
FIG. 5B is likewise a sectional view but shows a contact released state.

As shown in FIGS. 5A and 5B, when the contact opening- and closing-slide plate 9 moves forward following the inserting motion of the IC card 1, the pressure contact portion 7 of each contact 4 is received in the corresponding control hole 13 while being slidingly moved on a lower surface of the contact opening- and closing slide plate 9. Consequently, the pressure contact portion 7 projects above an upper surface of the slide plate 9 so as to be subjected to pressure contact with the external contact 5 of the IC card 1.

The contact opening- and closing-slide plate 9 is biased in a direction of withdrawal of the IC card 1, i.e., towards the card inlet port 2 by a spring 14. Thus, the contact opening- and closing-slide plate 9 also serves as a card ejecting member.

As shown in FIGS. 1 to 3, 7, 12 and 15, when the IC card 1 is inserted into the card receiving space 3, the contact opening- and closing-slide plate 9 moves forward following the inserting motion of the IC card 1 while compressing the spring 14, thereby accumulating ejecting resilient force. When the contact opening- and closing-slide plate 9 comes to a predetermined forward position, a pressure causes contact 4 to contact the corresponding external contact 5 of the IC card 1.

On the other hand, there is a provision of a resilient lock arm 15 having an engagement portion 16, which is resiliently contacted with one side edge of the side guide 10 of the slide plate 9 acting as a card ejecting member which moves following the inserting motion of the IC card and relatively slidably moves on the one side edge to thereby accumulate preliminary resilient force.

A sliding portion 24 disposed at the lock arm 15 causes the engagement portion 16 to engage, by the preliminary resilient force, with a recess 17a or protrusion 17b formed in the one side edge portion of the side guide 10 while being relatively slidably moved on the one side edge of the side guide 10 when the IC card 1 is inserted to a predetermined location, thereby establishing a locked state of the card ejecting member 9.

FIGS. 1 to 4 show the example in which the side guide 10 of the contact opening- and closing-slide plate 9 acting as the card ejecting member is provided at a rear end thereof, i.e., end portion on the side of the card inlet port 2 with the protrusion 17b projecting sideways.

Figure 2:
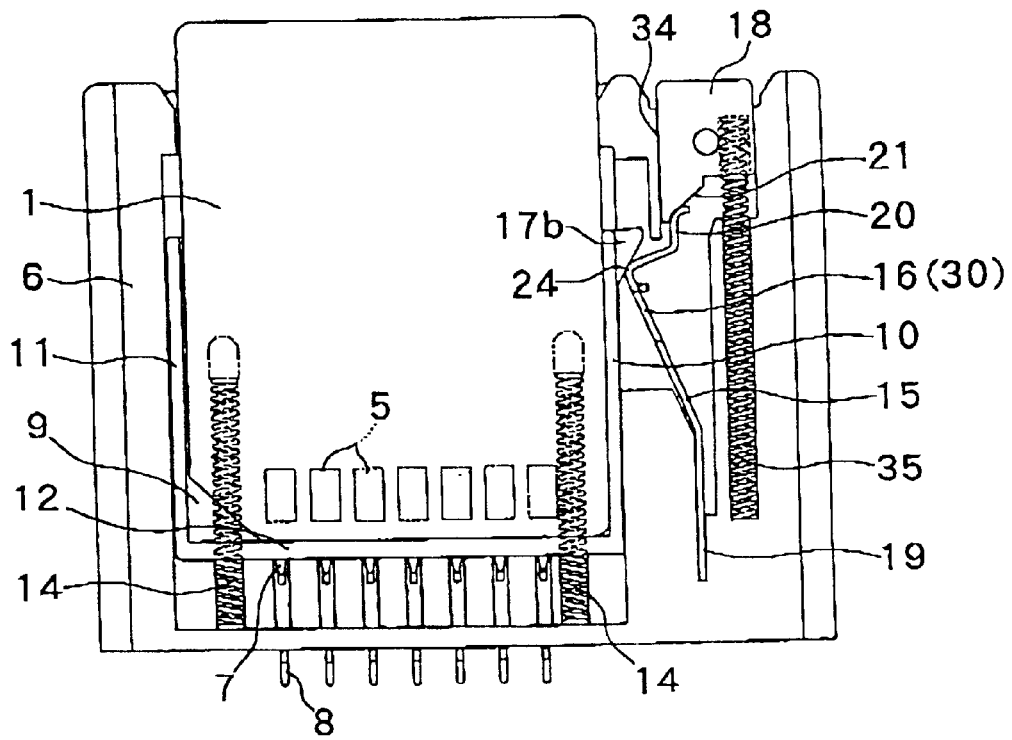
Figure 3:
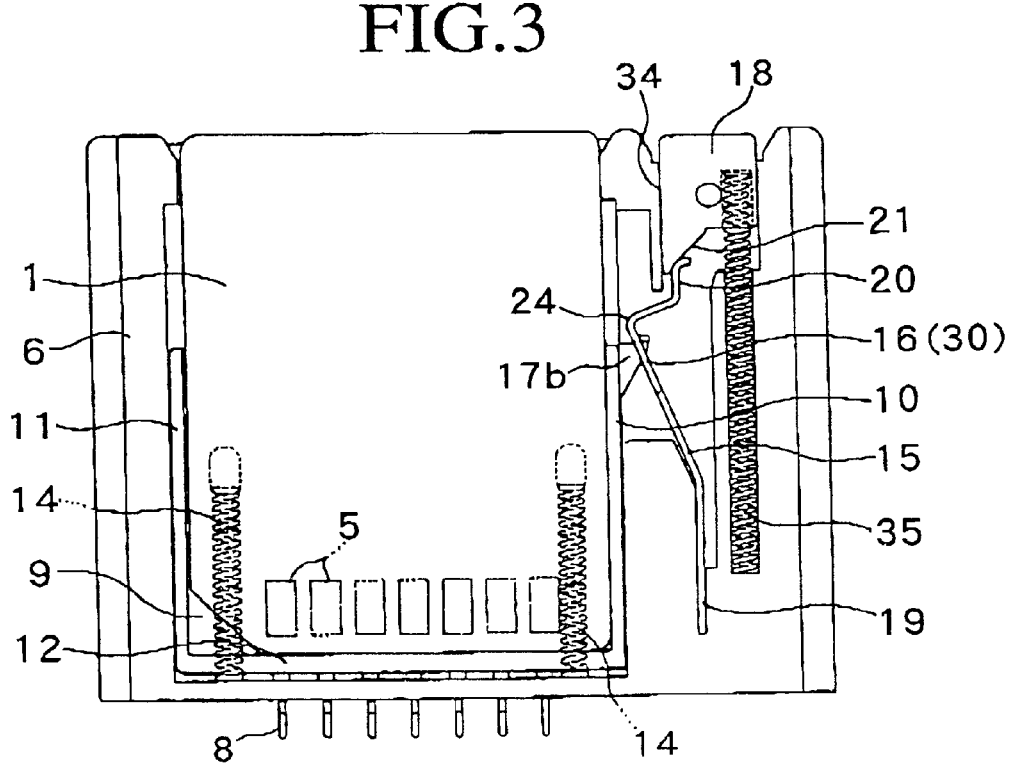

In this example, as shown in FIGS. 2 and 3, the sliding portion 24 of the lock arm 15 is relatively moved while being resiliently contacted with one side surface of the side guide 10 of the contact opening- and closing-member 9, i.e., one side surface of the protrusion 17b, thereby accumulating preliminary resilient force.

As shown in FIG. 1, when the IC card 1 is not yet inserted, the sliding portion 24 of the lock arm 15 is located slightly away from the side surface of the side guide 10 of the contact opening- and closing-slide plate 9. When the contact opening- and closing-slide plate 9 is moved forward following the inserting motion of the IC card 1, the sliding portion 24 is displaced sideways while being resiliently contacted with an outer side surface of the protrusion 17b, i.e., side surface of the one side edge (side surface of the side guide 10) of the slide plate 9, thereby accumulating preliminary resilient force.

In the standby position for insertion of the IC card 1 as shown in FIG. 1, the sliding portion 24 of the lock arm 15 is resiliently contacted with the outer side surface of the slide guide 10, thereby accumulating a part of the preliminary resilient force.

Figure 6:
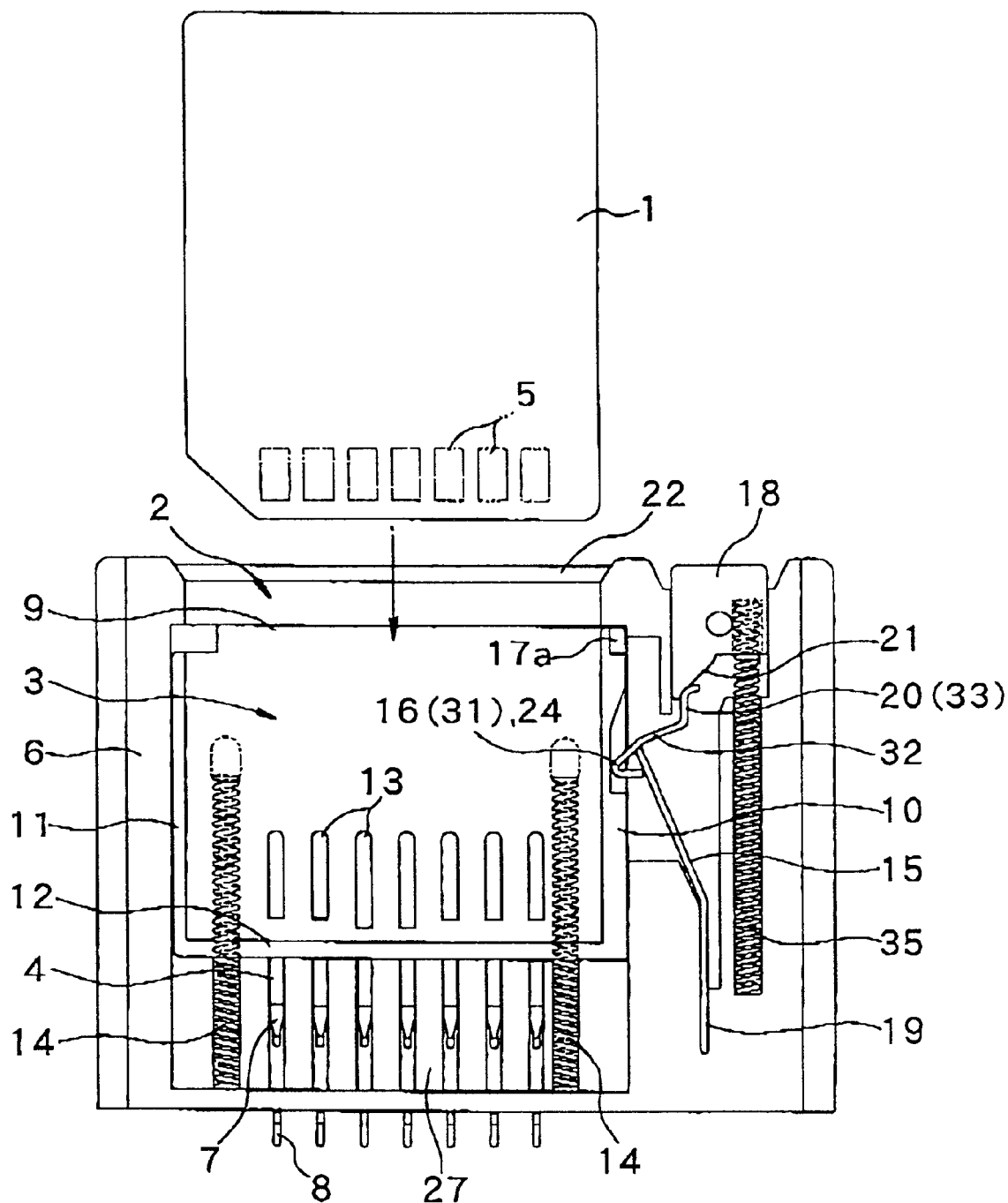
Figure 7:
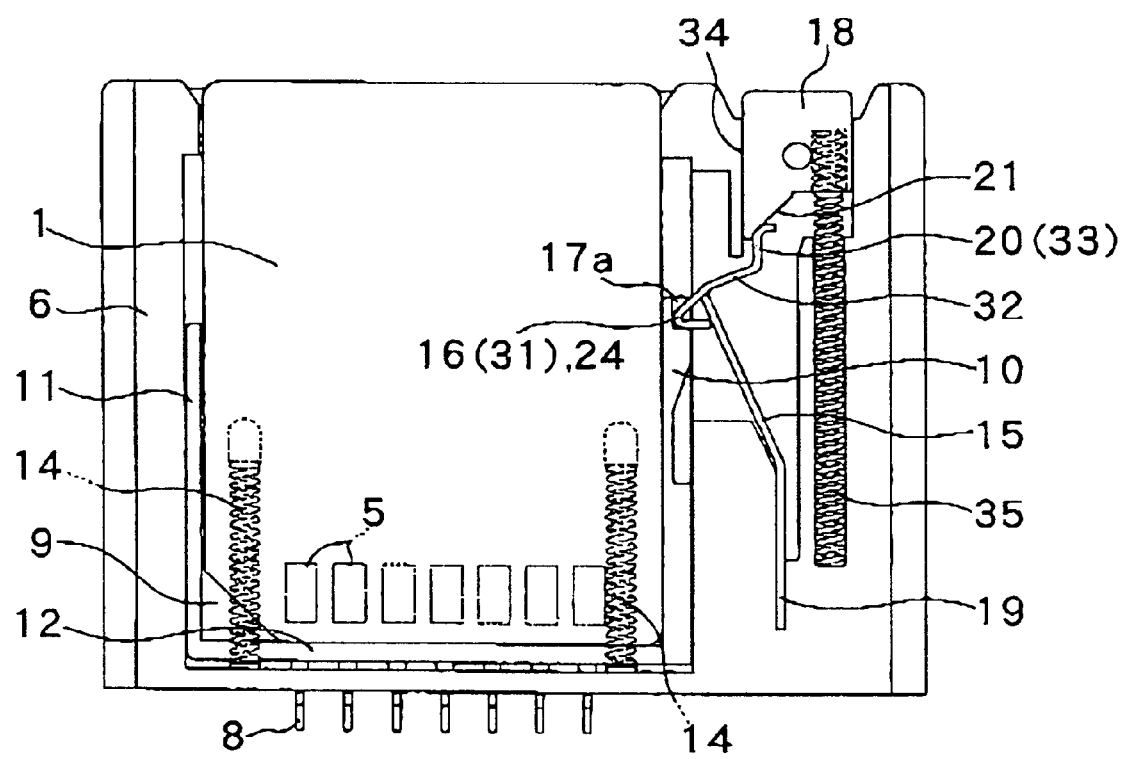

FIGS. 6 and 7 show the example, in which the contact opening- and closing-slide plate 9 acting as the card ejecting member is provided at a rear end thereof, i.e., at an end on the side of the card inlet port with the recess 17a.

In this example, the sliding portion 24 of the lock arm 15 is, as shown in FIG. 6, resiliently contacted with the side surface of the side guide 10 to establish a standby state, thereby accumulating preliminary resilient force. As shown in FIG. 7, when the contact opening- and closing-slide plate 9 is moved forward following the inserting motion of the IC card 1, the sliding portion 24 is displaced inwardly towards the recess 17a by the preliminary resilient force while being relatively slidably moved on the outer side a surface of the side guide 10 and engaged with an inner surface of the recess 17a to thereby establish a locked state.

Figure 8:
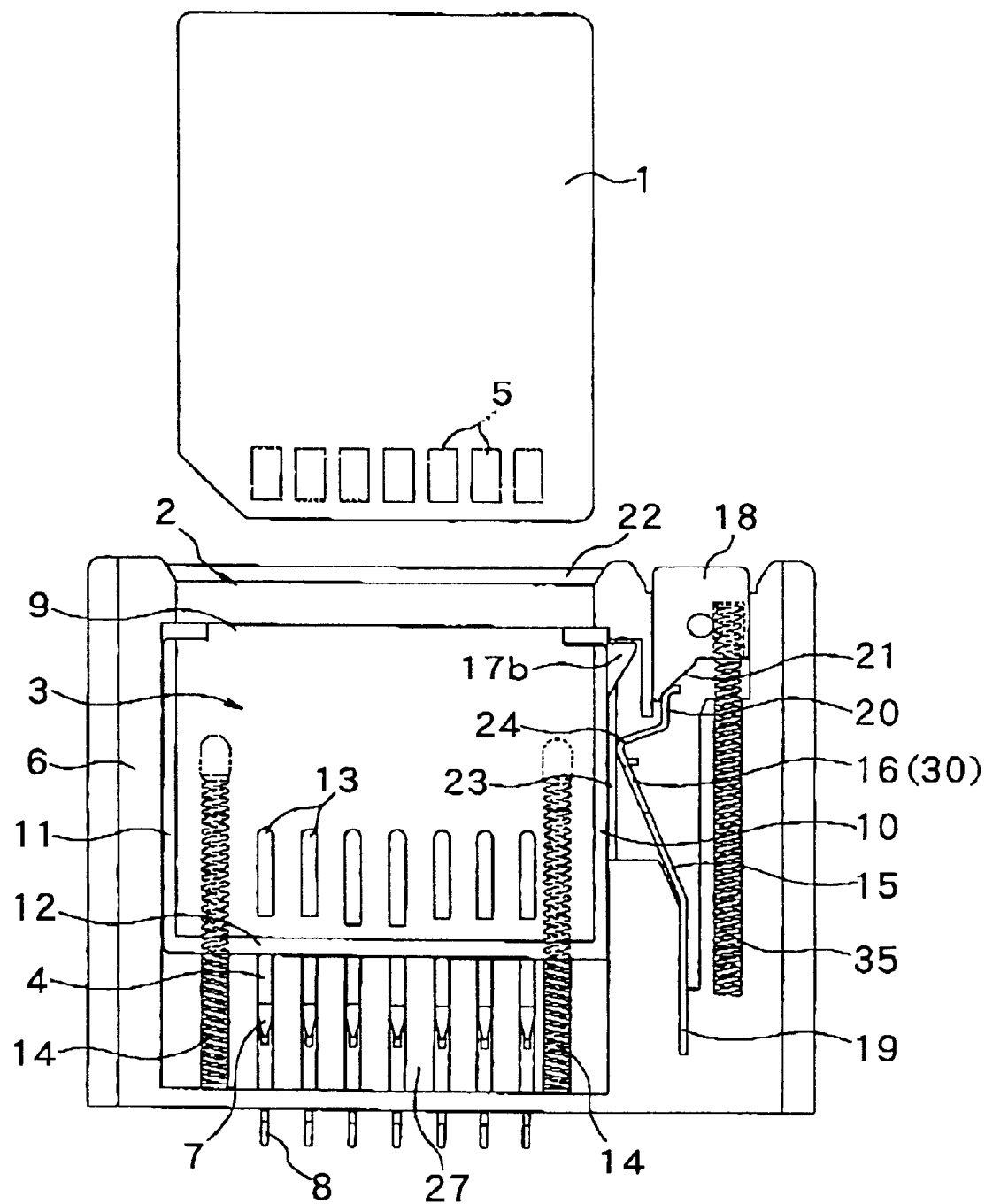
Figure 9:
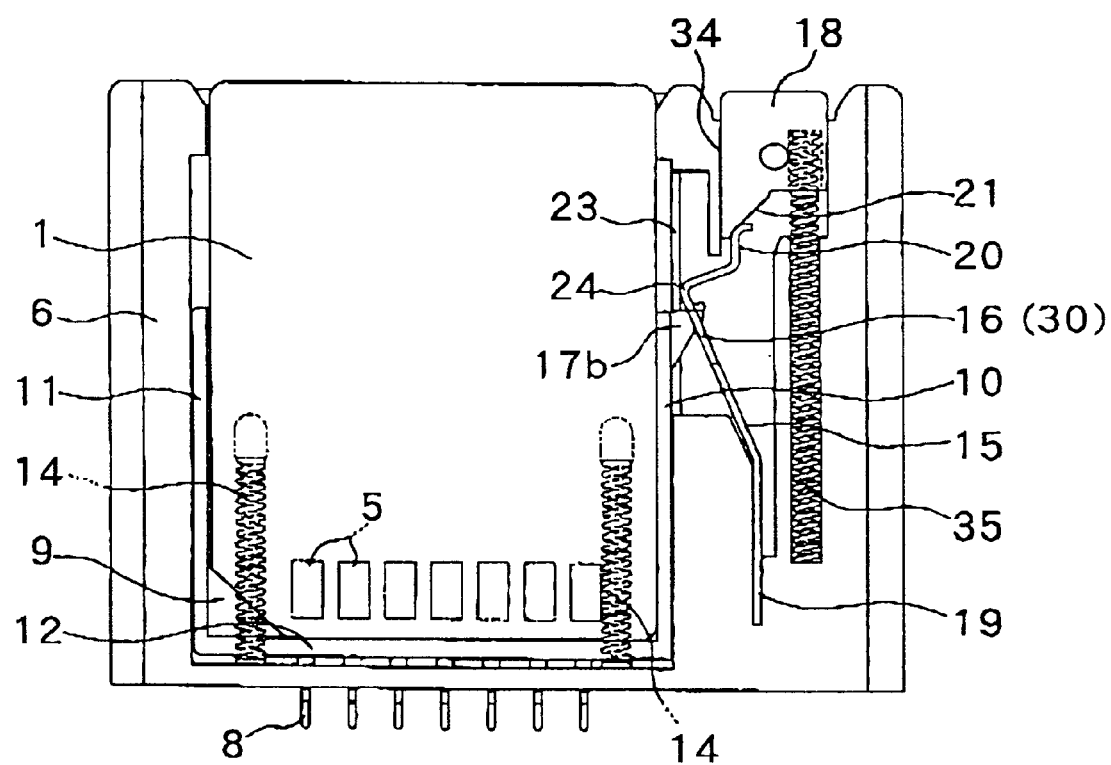

In FIGS. 8 and 9, a guide wall 23, which is integral with the card case 6, extends along the side guide 10 of the contact opening- and closing-slide, plate 9 so as to guide the reciprocal movement of the contact opening- and closing-slide plate 9. Before the IC card 1 is inserted as shown in FIG. 8, the sliding portion 24 of the lock arm 15 is resiliently contacted with the outer side surface of the guide wall 23, thereby establishing a standby state.

As shown in FIG. 9, when the contact opening- and closing-slide plate 9 is moved forward following the inserting motion of the IC card 1 into the card receiving space 3, the sliding portion 24 of the lock arm 15 is relatively slidably moved while being resiliently contacted with the outer side surface of the protrusion 17b projecting from the outer side surface of the side guide 10, thereby accumulating preliminary resilient force. When the sliding 13 portion 24 has climbed over the protrusion 17b, it is restored inwardly by the preliminary resilient force and the engagement portion 16 is engaged with a rear end face of the protrusion 17b.

Thus, the contact opening- and closing-slide plate 9 acting as the card ejecting member is locked in the advanced position and as a result, the contact 4 and the corresponding external contact 5 of the IC card 1 is kept contacted.

FIGS. 10 to 16 show the example, in which the contact opening- and closing-slide plate 9 is not provided with the side guides 10,11, and the lock arm 15 is brought into engagement with and disengagement from the recess 17a which is formed in the side edge of the IC card 1.

In FIGS. 10 to 13, the lock arm 15 is resiliently contacted with the side surface of one side edge of the IC card 1 which is received in the card receiving space 3 through the card inlet port 2, thereby accumulating preliminary resilient force.

Figure 14:
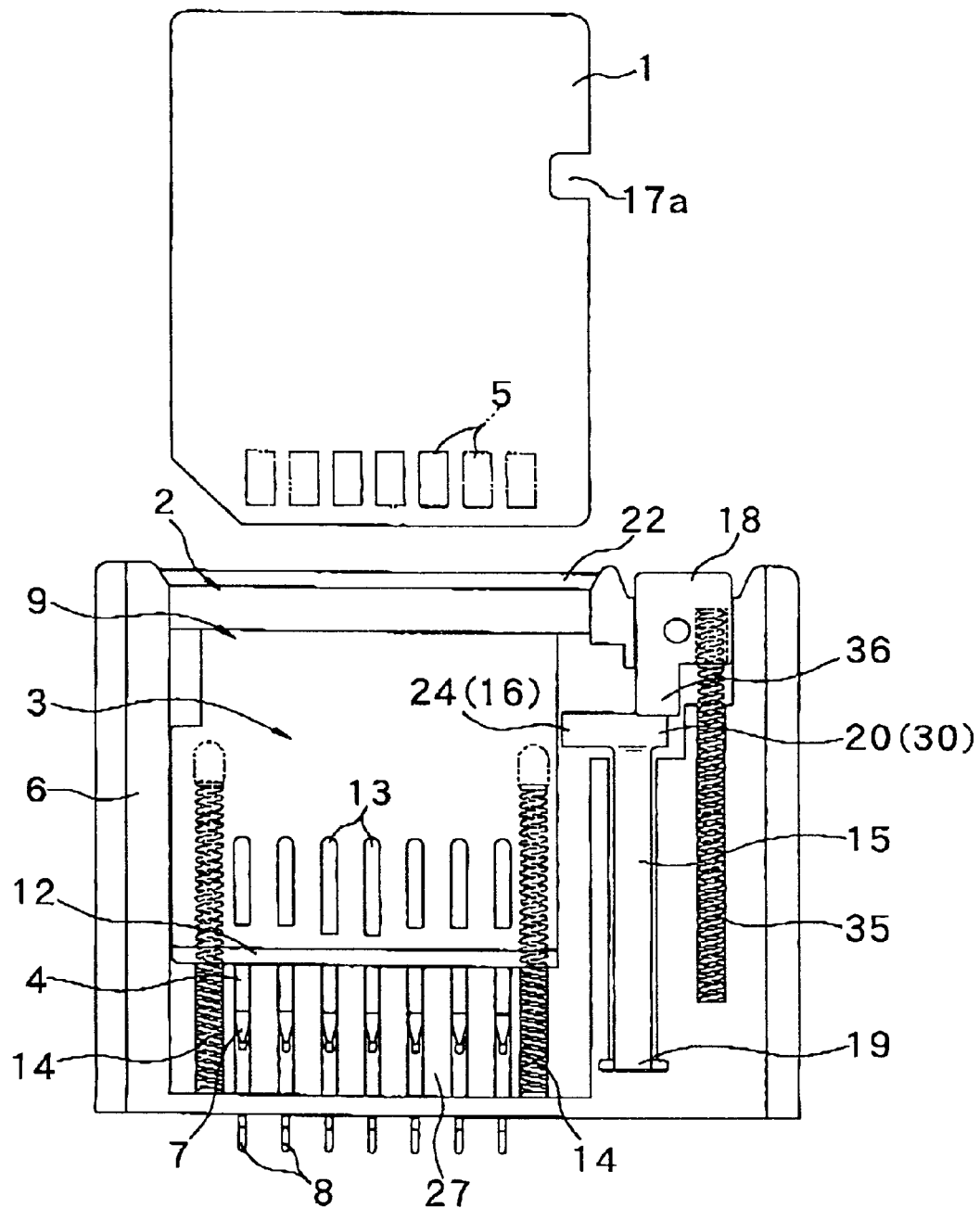
FIG. 14 is a plan view of a modified example of the lock and lock releasing mechanism of FIG. 10, showing a state immediately before insertion of an IC card.
Figure 15:
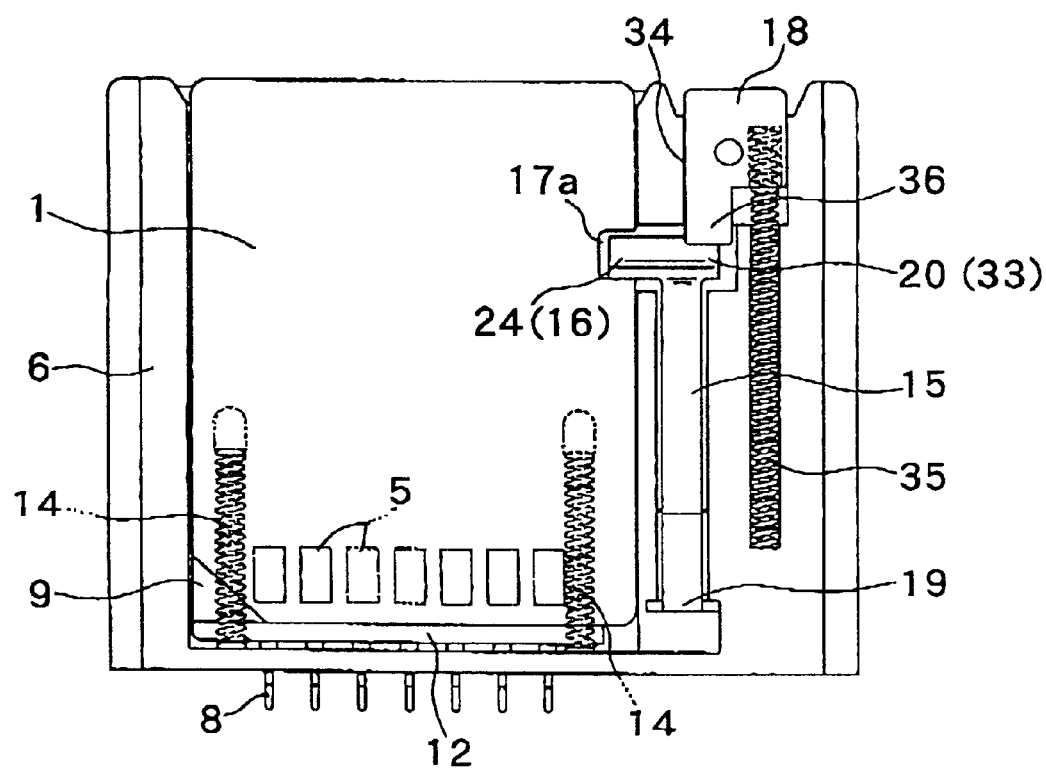
FIG. 15 is likewise a plan view of FIG. 14 but shows a state after complete insertion (locked state) of an IC card.
Figure 16:
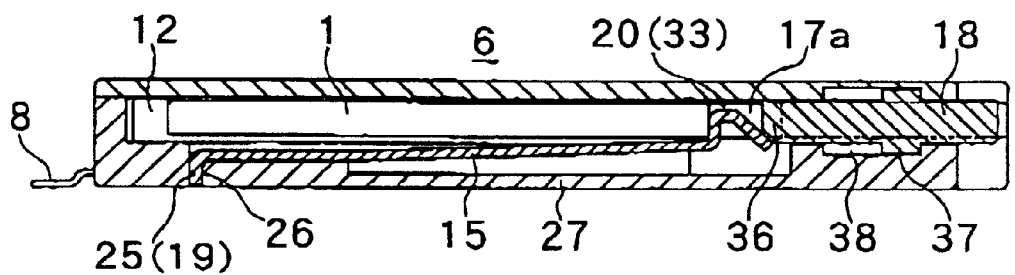
FIG. 16 is a sectional view of the lock and lock releasing mechanism of FIG. 15.

On the other hand, in FIGS. 14 to 16, the lock arm 15 is resiliently contacted with an upper surface of one side edge of the IC card 1 which is received in the card receiving space 3 through the card inlet port 2, thereby accumulating preliminary resilient force.

Similarly, in FIGS. 1 to 9, the sliding portion 24 of the lock arm 15 may be resiliently contacted with an upper surface of one side edge of the card ejecting member 9 to thereby accumulate preliminary resilient force, so that the lock arm 15 is engaged with the recess 17a or protrusion 17b formed at one side edge of the card ejecting member 9 by the preliminary resilient force.

FIGS. 1 to 9 show the example, in which the sliding portion 24 of the lock arm 15 is resiliently contacted with the side surface of one side edge of the card ejecting member 9 to thereby accumulate preliminary resilient force, so that the lock arm 15 is engaged with the recess 17a or protrusion 17b formed at one side edge of the card ejecting member 9 by the preliminary resilient force.

When the IC card 1 is inserted to a predetermined location, the resilient lock arm 15 of FIGS. 10 to 16 is resiliently engaged in the recess 17a formed in one side edge of the IC card 1 by the preliminary resilient force while being relatively slidably moved on one side edge of the IC card 1, thereby establishing a locked state of the IC card 1.

Specifically, when the IC card 1 is inserted into the card receiving space 3 through the card inlet port 2, the contact opening- and closing-slide plate 9 is moved forward following the inserting motion of the IC card 1 while compressing the spring 14, thereby accumulating ejecting resilient force. A pressure causes contact 4 to contact with the corresponding external contact 5 of the IC card 1 as the slide plate 9 moves into a predetermined advanced position.

On the other hand, the lock arm 15 is resiliently contacted with the side surface or upper surface of one side edge of the IC card 1 and relatively slidably moved on the one side surface to thereby accumulate a preliminary resilient force.

When the IC card 1 is inserted to a predetermined location, the sliding portion 24 of the lock arm 15 causes the engagement portion 16 to be engaged in the recess 17a formed in one side edge of the IC card 1 by way of the preliminary resilient force while being relatively slidably moved on the one side edge of the IC card 1, thereby establishing a locked state of the IC card 1 with respect to the card ejecting member 9.

On the other hand, as shown in FIGS. 1 to 16, there is a provision of a control member 18 for resiliently displacing the lock arm 15 outwardly against the resilient force, thereby establishing a lock released state.

In the above-mentioned standby state, when the control member 18 is pushed inwardly, the resilient lock arm 15 is displaced outwardly to disengage the engagement portion 16 from the recess 17a or protrusion 17b, thereby establishing a lock released state of the card ejecting member 9, i.e., contact opening- and closing slide plate 9 with respect to the IC card 1.

When the lock released state has been established, the IC card 1 is ejected by the ejecting resilient force of the card ejecting member 9.

The resilient lock arm 15 is formed of a cantilever arm extending from a basal end 19 which is fixed, towards the card inlet port 2. The other end of the resilient lock arm 15 is the opposite end to the fixed basal end 19 of the cantilever arm and includes a pressure receiving portion 20. The pressure receiving portion 20 is acted on by the control member 18 so that the cantilever arm is resiliently displaced outwardly at the fixed basal end 19 as a supporting point and the engagement portion 16 is disengaged from the recess 17a or protrusion 17b.

The lock releasing control member 18 is provided at an inner end face thereof with a slant surface 21 which is formed of a linear surface or curved surface for pressing the pressure receiving portion 20 of the lock arm 15. When the control member 18 is in the standby state, the pressure receiving portion 20 is disposed in resilient abutment or proximately opposing relation to the slant surface 21.

The wall forming the card inlet port 2, as shown in FIGS. 1 to 16, is provided on a front surface thereof with a concave portion 22 and the card inlet port 2 is open at an inner side surface of the concave portion 22. The IC card 1 is inserted to reach the opening surface of the card inlet port 2 of the concave portion 22 to establish a locked state by means of the lock arm 15, so that a rear end of the IC card 1 does not project from the card inlet port 2 when the IC card 1 is inserted.

Figure 10:
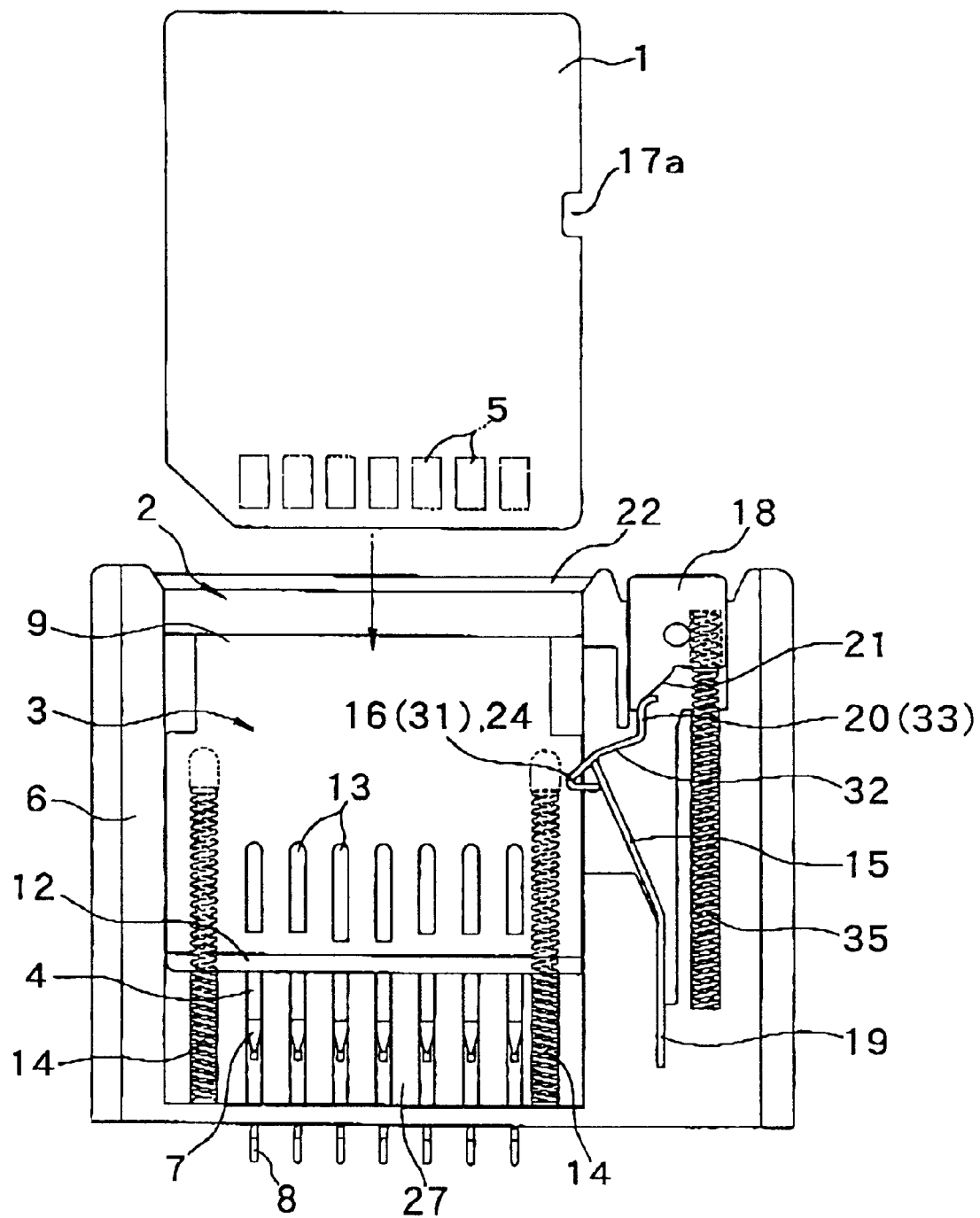
Figure 18:
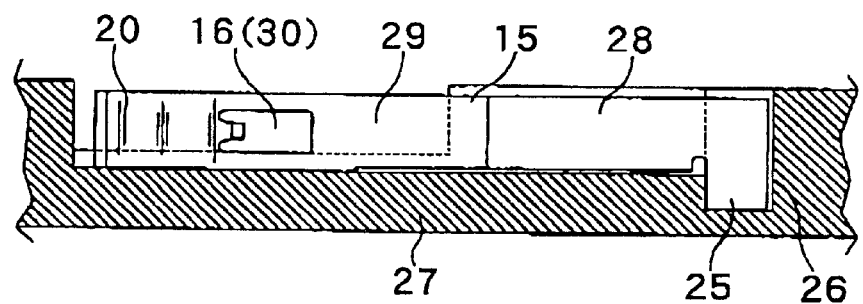
FIG. 18 is a sectional view showing an installing portion of a lock arm.
Figure 19:
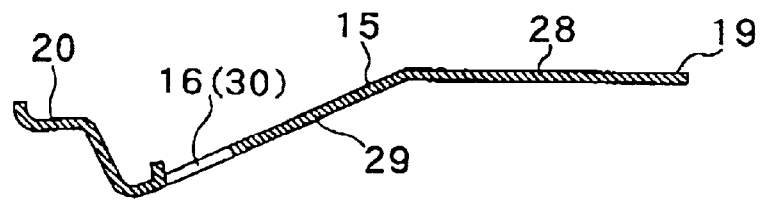
FIG. 19 is a sectional view of the lock arm.

As shown in FIGS. 1 to 16, the overall lock arm 15 is formed of a metal wire or elongated metal plate. For example, as shown in FIGS. 18 and 19, an elongated metal plate is punched out by drawing and then bent to form the lock arm 15 having resiliency. As shown in FIGS. 1 and 10, as well as in other figures, the punched-out plate surface of the lock arm 15 is placed opposite the thick surface (side surface) of the IC card 1 and the plate wall surface of the lock arm 15 is disposed in such a manner as to be oriented in the direction of the thickness, i.e., up and down directions, of the IC card 1.

As shown in FIG. 18, a leg piece 25 formed on a basal end portion of the lock arm 15 is press-fitted into or simply inserted into a support hole 26 formed in a bottom plate 27 of the card case 6. The lock arm 15 extends towards the card inlet port 2 along the upper surface of the bottom plate 27 of the card case 6.

Specifically, the lock arm 15 of FIGS. 1 to 13 includes a support piece 28 whose one end is connected to the leg piece 25 and a spring piece 29 bent or curved in such a manner as to be inclined forwardly inwardly from the other end of the support piece 28. The engagement portion 16 is retained by the spring piece 29.

For example, as shown in FIGS. 1 to 4, 8, 9, 18 and 19, the engagement portion 16 is formed of an engagement hole 30 which is formed in the vicinity of the end portion of the spring piece 29 and the protrusion 17b is engaged in the engagement hole 30 to thereby establish the locked state.

As shown in FIGS. 6 and 7, a protrusion 31 is upwardly press worked at the end portion of the spring piece 29 and the protrusion 31 is engaged in the recess 17a which is formed in the card ejecting member 9, thereby establishing the locked state. The protrusion 31 also serves as the sliding portion 24.

Similarly, as shown in FIGS. 10 to 13, the protrusion 31 is upwardly press worked at the end portion of the spring piece 29 and the protrusion 31 is engaged in the recess 17a which is formed in one side edge of the IC card 1, thereby establishing the locked state. This protrusion 31 also serves as the sliding portion 24.

That is to say, as shown in FIG. 6, a top portion of the protrusion 31 is resiliently contacted with an outer side surface of the side guide 10 of the contact opening- and closing-slide plate 9 acting as the card ejecting member, thereby accumulating preliminary resilient force and engaged in the recess 17a while being relatively slidably moved on the outer surface of the side guide 10, thereby establishing the locked state.

Figure 11:
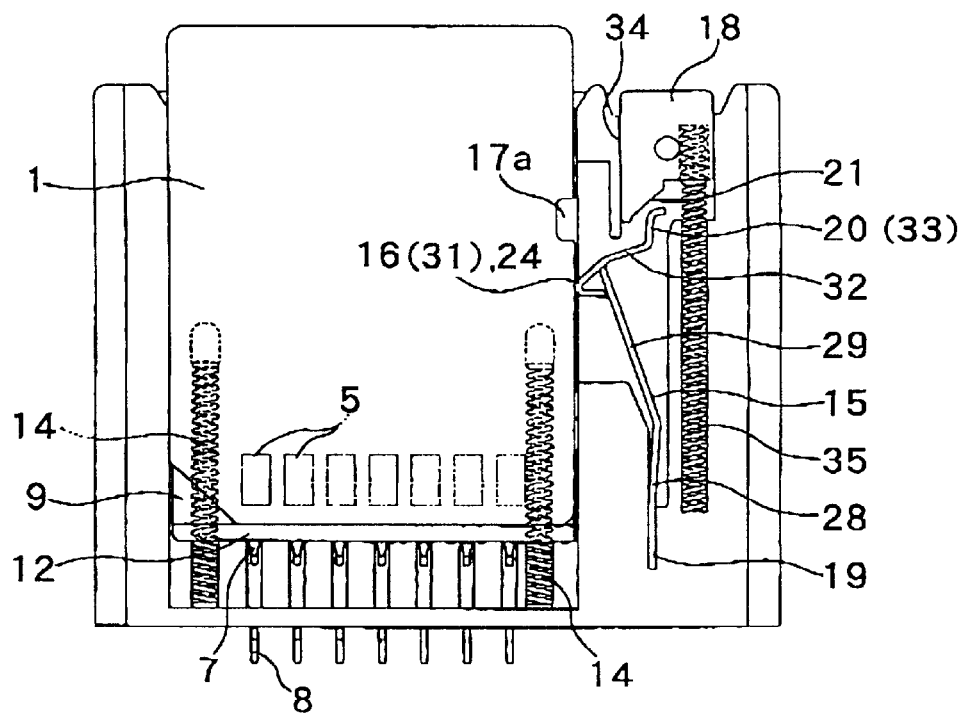
Figure 12:
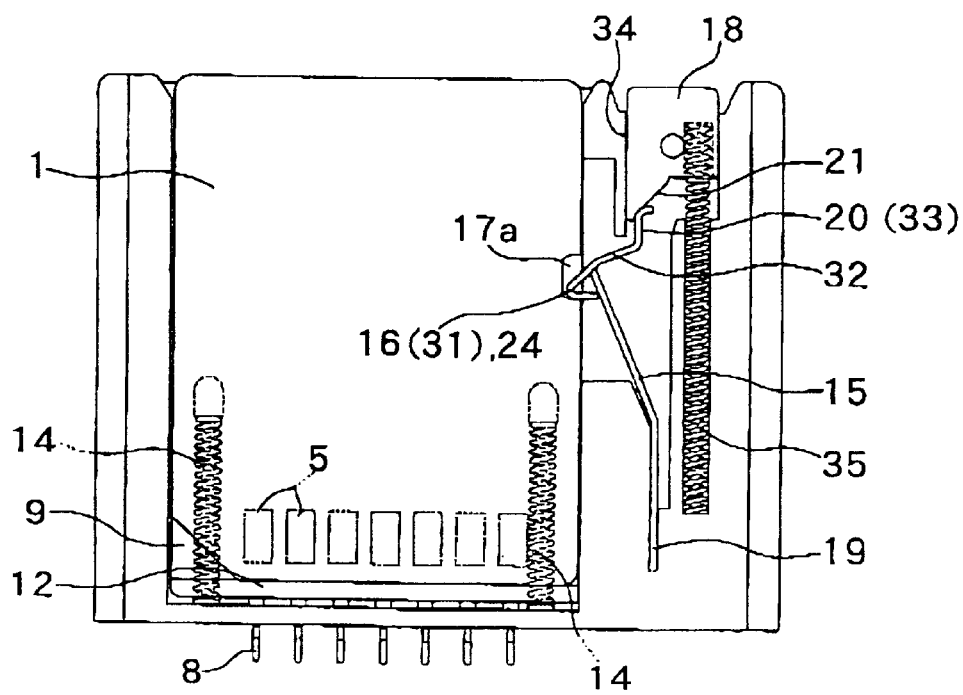
Figure 13:
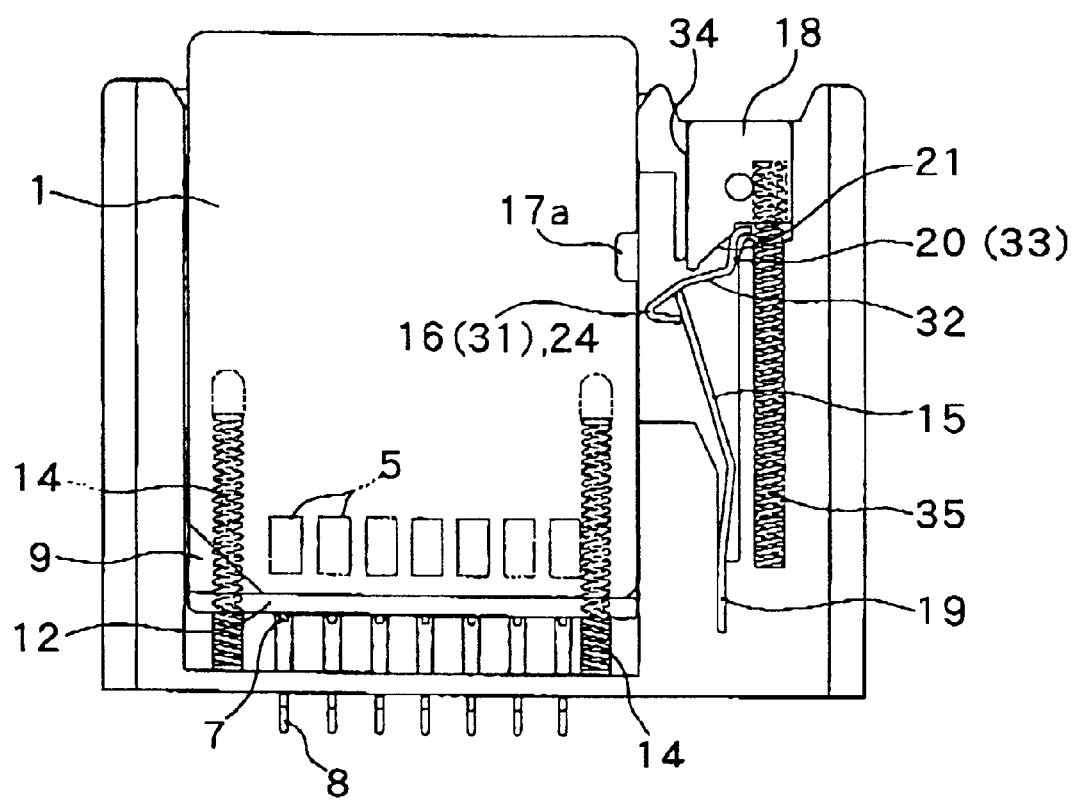

Similarly, as shown in FIGS. 11 and 12, the top portion of the protrusion 31 is resiliently contacted with the outer surface of the IC card 1 to thereby accumulate preliminary resilient force and engage in the recess 17a which is formed in the IC card 1 while being relatively slidably moved on the outer surface of the IC card 1, thereby establishing the locked state.

Further, as shown in FIGS. 6, 7 and 10, as well as in other figures, a pressure receiving arm 32 extends outwardly from the end portion of the spring piece 29 of the lock arm 15, the sliding portion 24 is formed at the connecting curved portion between the pressure receiving arm 32 and the spring piece 29, a pressure receiving piece 33 is upwardly press worked at the end portion of the pressure receiving arm 32 and the control member 18 is disposed opposite the pressure receiving element 33 such that a slant surface 21 of the control member 18 acts on an inner surface of the end portion of the pressure receiving piece 33.

As shown in FIGS. 2 and 8, the sliding portion 24 is resiliently contacted with the protrusion 17b of the side guide 10 of the contact opening- and closing slide plate 9 and the outer surface of the guide wall 23 to thereby accumulate preliminary resilient force. Similarly, as shown in FIG. 11, the sliding portion 24 is resiliently contacted with the outer surface of the IC card 1 to thereby accumulate the preliminary resilient force.

The lock arm 15 of FIGS. 14 to 16 is formed of an elongated plate which is obtained by punching out or blanking. The leg piece 25 is formed on one end of the lock arm 15. The lock arm 15 is firmly secured to the bottom plate 27 of the card case 6 with the leg piece 25 inserted in the support hole 26 which is formed in the bottom plate 27. The lock arm 15 extends from the fixed end 19 towards the card inlet port 2 along the upper surface of the bottom plate 27. The lock arm 15 of FIG. 14 has a plate wall surface placed opposite the side surface of the IC card 1 and also a punched-out plate surface oriented in the direction of the thickness, i.e., up and down directions, of the IC card 1.

The lock arm 15 of FIG. 14 can be resiliently displaced upwardly and downwardly about the fixed end 19 serving as a supporting point, and a free end of the lock arm 15 located opposite to the fixed end is connected to an engagement portion 16 which also serves as the sliding portion 24. The engagement portion 16 is resiliently contacted with one side edge of the IC card 1 to thereby accumulate the preliminary resilient force.

The engagement portion 16, which also serves as the sliding portion 24, is provided with a pressure receiving portion 20 on which the control member 18 acts. When the IC card 1 is inserted into the card receiving space 3, the sliding portion 24 is relatively slidably moved while being resiliently contacted with the upper surface of the one side edge of the IC card 1, thereby accumulating preliminary resilient force. When the IC card 1 is inserted to a predetermined location, the engagement portion 16, which also serves as the sliding portion 24, is engaged in the recess 17a, formed in the one side edge of the IC card 1, by way of the preliminary resilient force, thereby establishing the locked state.

The control member 18 acts on the upper surface of the pressure receiving portion 20 to cause the lock arm 15 to be resiliently displaced downwardly against its resiliency, thereby establishing the lock released state. This lock release allows the card ejecting member 9 to press the IC card 1 so that the IC card 1 projects from the card inlet port 2.

As shown in FIGS. 2–4, 7, 9, 11–13 and 15, the control member 18 is slidably fitted in a slide guide port 34 disposed adjacent to the card inlet port 2 such that the control member 18 can reciprocally move in the same direction as the direction of insertion/withdrawal of the IC card 1. The slant surface 21 disposed at the inner end face of the control member 18 shown in FIGS. 1–3 and 6–13 is resiliently contacted with the pressure receiving piece 33, i.e., pressure receiving portion 20. The slant surface 21 and the pressure receiving piece 33 are disposed proximate to and in opposing relation with each other.

Accordingly, when the IC card 1 is not yet inserted (in a lock released state) as shown in FIGS. 1, 6 and 8, as well as in other figures and when the IC card 1 is in a locked state (IC card inserted state) as shown in FIGS. 3, 7 and 9, as well as in other figures, the slant surface 21 of the control member 18 is abutted with the pressure receiving piece 33 and held in the retracted position (standby position) of the control member 18. That is to say, a standby state is established in which the rear end of the control member 18 is exposed from the slide guide port 34.

In order to ensure the standby position of the control member 18, the control member 18 may be resiliently retained by spring means 35 such as a coiled spring.

Figure 4:
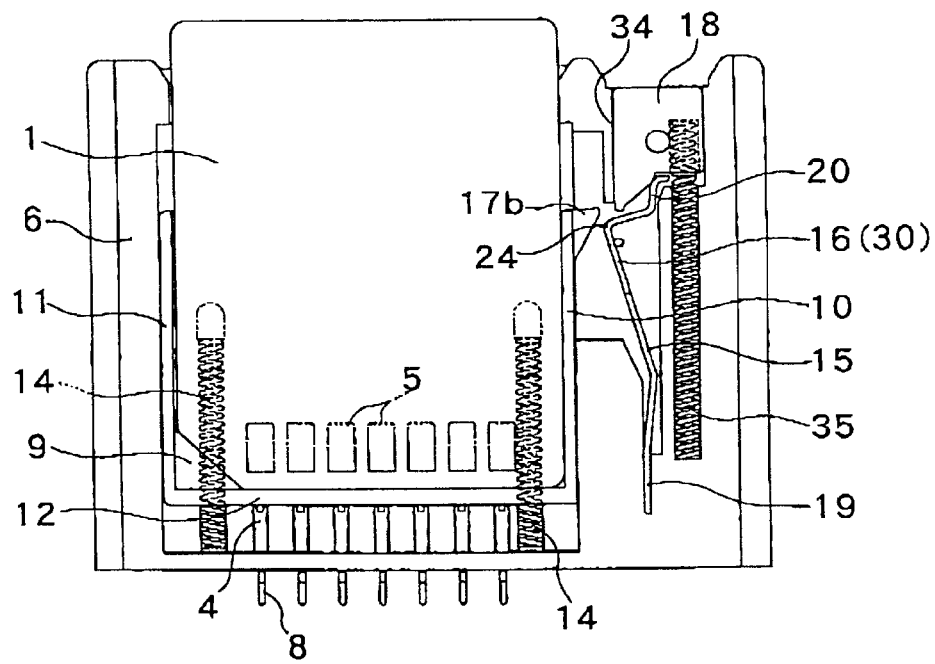

As shown in FIGS. 2 to 4, as well as in other figures, when the control member 18, which is in the standby state, is pushed inwardly with a finger, the slant surface 21 presses the pressure receiving piece 33 such that the spring portion 29 of the lock arm 15 is resiliently displaced outwardly together with the engagement portion 16 against its resilient force by component force of the slant surface 21.

As a result, the engagement portion 16, i.e., engagement hole 30 or protrusion 31 is disengaged from the engagement recess 17a or engagement protrusion 17b, thereby establishing the lock releasing state. This lock release allows the contact opening- and closing-slide plate 9 acting as the card ejecting member to be retracted by the spring 14. Following this retracting motion, the front end face of the IC card 1 is pressed by the front abutment 12 so as to be retracted, thereby allowing the rear end portion of the IC card 1 to project from the card inlet port 2. The user can withdraw the IC card 1 by grabbing the rear end portion of the IC card 1.

On the other hand, the control member 18 of FIGS. 14 to 16 is provided at an inner end thereof with a pressing portion 36 for acting on an upper surface or lower surface of the pressure receiving portion 20 of the lock arm 15. By means of a pushing operation of the control member 18, the pressing portion 36 presses the upper surface or lower surface of the pressure receiving portion 20 to disengage it upwardly or downwardly from the recess 17a, thereby establishing the lock released state.

Figure 17:
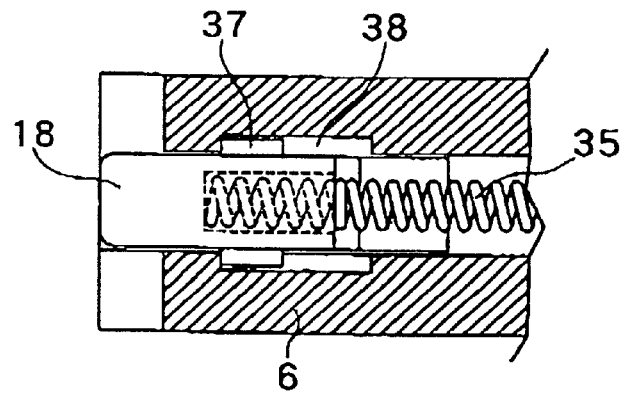
FIG. 17 is a sectional view showing an installing portion of a lock releasing control member.

As shown in FIG. 17, the control member 18 is provided with a slider 37. The slider 37 is slidably engaged in a guide groove 38 which is formed in the card case 6. The reciprocal movement of the control member 18 is guided and restricted in amount of movement by the guide groove 38 and slider 37.

Preferably, the control member 18 and the lock arm 15 are abuttingly in contact with each other, instead of being linked together by means of a pin or the like.

According to the present invention, by means of a pushing operation of the control member, the lock released state can easily be established by the lock arm. Therefore, the load incurred by the IC card is removed and the IC card can be ejected properly. Consequently, the IC card can be withdrawn without damage and there is no need to overly increase the ejecting force of the card ejecting member.

Also, a co-acting mechanism of the lock arm and control member can be formed in a simple manner and a lock and lock releasing mechanism, which is simple in structure, can be obtained.

Furthermore, according to the present invention, when the IC card is inserted, a locked state can be established automatically. And the pushing operation of the control member makes it possible to obtain an automatic card ejecting operation.

It is to be understood that the form of the present invention herewith illustrated and described is to be taken as the preferred embodiment of the same, and that various changes in the shape, size and arrangement of parts may be resorted to without departing from the spirit of the invention or the scope of the subjoined claims.

What is claimed is:

1. An IC card connecting mechanism for receiving an IC card having a recess formed on one side edge thereof and for establishing a locked state and a lock released state of the IC card, said card connecting mechanism comprising:

a card case having a card receiving space for receiving the IC card and a card inlet port opening into said card receiving space; and a lock and lock releasing mechanism provided in said card case and comprising a card ejecting member including a slide plate for receiving the IC card, said card ejecting member being movably mounted in said card receiving space, a biasing member for biasing said card ejecting member in a direction outwardly of said card receiving space toward said card inlet port such that, upon insertion of the IC card through said card inlet port, said card ejecting member is moved in a direction inwardly of said card receiving space against a bias of said biasing member, a resilient lock arm arranged to resiliently contact the side edge of the IC card when the IC card is received in said card receiving space through said card inlet port, said resilient lock arm being arranged to engage in the recess formed on the side edge of the IC card so as to establish the locked state of the IC card, and a control member arranged to selectively engage said resilient lock arm and move said resilient lock arm against its resiliency to disengage said resilient lock arm from the recess of the IC card to establish the lock released state of the IC card, whereby said card ejecting member is caused to eject the IC card from said card case.

2. An IC card connecting mechanism according to claim 1, wherein said resilient lock arm comprises a cantilever arm having a fixed end, said cantilever arm having a second end opposite to said fixed end, said second end having a pressure receiving portion, said control member being arranged to engage said pressure receiving portion so that said second end of said cantilever arm is resiliently displaced about said fixed end to cause disengagement of said resilient lock arm from the recess, thereby establishing the lock released state of the IC card.

3. An IC card connecting mechanism according to claim 2, wherein said control member has an inner end surface which includes a slant surface for pressing said pressure receiving portion to obtain the lock released state, said pressure receiving portion being arranged to be disposed in abutment or proximately in opposing relation to said slant surface so as to establish a standby state of said control member.

4. An IC card connecting mechanism for receiving an IC card and for establishing a locked state and a lock released state of the IC card, said card connecting mechanism comprising:

a card case having a card receiving space for receiving the IC card and a card inlet port opening into said card receiving space; and a lock and lock releasing mechanism provided in said card case and comprising a card ejecting member including a slide plate for receiving the IC card, said card ejecting member having an engagement portion on one side edge thereof, said card ejecting member being movably mounted in said card receiving space, a biasing member for biasing said card ejecting member in a direction outwardly of said card receiving space toward said card inlet port such that, upon insertion of the IC card through said card inlet port, said card ejecting member is moved in a direction inwardly of said card receiving space against a bias of said biasing member, a resilient lock arm arranged to resiliently contact the side edge of said card ejecting member when the IC card is received in said card receiving space through said card inlet port, said resilient lock arm being arranged to engage said engagement portion formed on the side edge of said card ejecting member in order to establish the locked state of the IC card, and a control member arranged to selectively engage said resilient lock arm and move said resilient lock arm against its resiliency to disengage said resilient lock arm from said engagement portion formed on the side edge of said card ejecting member to establish the lock released state of the IC card, whereby said card ejecting member is caused to eject the IC card from said card case.

5. An IC card connecting mechanism according to claim 4, wherein said engagement portion comprises a recess.

6. An IC card connecting mechanism according to claim 5, wherein said resilient lock arm comprises a cantilever arm having a fixed end, said cantilever arm having a second end opposite to said fixed end, said second end having a pressure receiving portion, said control member being arranged to engage said pressure receiving portion so that said second end of said cantilever arm is resiliently displaced about said fixed end so as to cause disengagement of said resilient lock arm from said recess, thereby establishing the lock released state of the IC card.

7. An IC card connecting mechanism according to claim 6, wherein said control member has an inner end surface which includes a slant surface for pressing said pressure receiving portion to obtain the lock released state, said pressure receiving portion being arranged to be disposed in abutment or proximately in opposing relation to said slant surface so as to establish a standby state of said control member.

8. An IC card connecting mechanism according to claim 4, wherein said engagement portion comprises a protrusion.

9. An IC card connecting mechanism according to claim 8, wherein said resilient lock arm comprises a cantilever arm having a fixed end, said cantilever arm having a second end opposite to said fixed end, said second end having a pressure receiving portion, said control member being arranged to engage said pressure receiving portion so that said second end of said cantilever arm is resiliently displaced about said fixed end so as to cause disengagement of said resilient lock arm from said protrusion, thereby establishing the lock released state of the IC card.

10. An IC card connecting mechanism according to claim 9, wherein said control member has an inner end surface which includes a slant surface for pressing said pressure receiving portion to obtain the lock released state, said pressure receiving portion being arranged to be disposed in abutment or proximately in opposing relation to said slant surface so as to establish a standby state of said control member.

11. An IC card connecting mechanism according to claim 4, wherein said resilient lock arm comprises a cantilever arm having a fixed end, said cantilever arm having a second end opposite to said fixed end, said second end having a pressure receiving portion, said control member being arranged to engage said pressure receiving portion so that said second end of said cantilever arm is resiliently displaced about said fixed end so as to cause disengagement of said resilient lock arm from said engagement portion, thereby establishing the lock released state of the IC card.

12. An IC card connecting mechanism according to claim 11, wherein said control member has an inner end surface which includes a slant surface for pressing said pressure receiving portion to obtain the lock released state, said pressure receiving portion being arranged to be disposed in abutment or proximately in opposing relation to said slant surface so as to establish a standby state of said control member.

* * * * *